US007128996B2

(12) United States Patent
Nishihata et al.

(10) Patent No.: US 7,128,996 B2
(45) Date of Patent: Oct. 31, 2006

(54) SEPARATOR FOR SOLID POLYMER FUEL CELLS, AND PRODUCTION PROCESS THEREOF

(75) Inventors: Naomitsu Nishihata, Fukushima (JP); Masahito Tada, Fukushima (JP)

(73) Assignee: Kureha Corporation, Tokyo (JP)

( * ) Notice: Subject to any disclaimer, the term of this patent is extended or adjusted under 35 U.S.C. 154(b) by 366 days.

(21) Appl. No.: 10/477,294

(22) PCT Filed: May 10, 2002

(86) PCT No.: PCT/JP02/04542

§ 371 (c)(1), (2), (4) Date: Nov. 10, 2003

(87) PCT Pub. No.: WO02/093670

PCT Pub. Date: Nov. 21, 2002

(65) Prior Publication Data

US 2004/0146768 A1 Jul. 29, 2004

(30) Foreign Application Priority Data

May 11, 2001 (JP) ............................ 2001-142391

(51) Int. Cl.
*H01M 2/00* (2006.01)
*H01B 1/06* (2006.01)
*B29C 45/00* (2006.01)

(52) U.S. Cl. ...................... 429/34; 252/511; 264/328.1

(58) Field of Classification Search .................. 429/34; 252/511; 264/328.1

See application file for complete search history.

(56) References Cited

U.S. PATENT DOCUMENTS 4,772,422 A * 9/1988 Hijikata et al. ............. 252/511

FOREIGN PATENT DOCUMENTS

| | | |
|---|---|---|
| EP | 0784352 | 7/1997 |
| EP | 1059348 | 12/2000 |
| EP | 1061597 | 12/2000 |
| JP | 05-104642 | 4/1993 |
| JP | 05-109415 | 4/1993 |
| JP | 08-117598 | 5/1996 |
| JP | 08-133846 | 5/1996 |
| JP | 09-104014 | 4/1997 |
| JP | 10-125337 | 5/1998 |
| JP | 10-167826 | 6/1998 |
| JP | 11-126622 | 5/1999 |
| JP | 11-126621 | 11/1999 |
| JP | 2000017179 | 1/2000 |
| JP | 2000100447 | 4/2000 |
| JP | 2000223133 | 8/2000 |
| JP | 2000243409 | 9/2000 |
| JP | 2001055493 | 2/2001 |
| JP | 2001122677 | 5/2001 |
| WO | WO9702612 | 1/1997 |

* cited by examiner

*Primary Examiner*—Patrick Joseph Ryan
*Assistant Examiner*—Thomas H. Parsons
(74) *Attorney, Agent, or Firm*—Dinsmore & Shohl LLP

(57) ABSTRACT

The invention provides a solid polymer fuel cell separator that is molded or formed of a resin composition comprising a thermoplastic resin, a conductive carbon black having a bulk density of at least 0.3 g/ml and a DBP oil absorption of up to 150 ml/100 g and optionally a conductive filler having a volume resistivity of less than 1 Ω·cm. The invention also provides a solid polymer fuel cell separator production process involving injection molding of the resin composition.

24 Claims, 1 Drawing Sheet

SEPARATOR FOR SOLID POLYMER FUEL CELLS, AND PRODUCTION PROCESS THEREOF

TECHNICAL FIELD

The present invention relates generally to a separator (i.e., bipolar plate) for a solid polymer fuel cell (SPFC; i.e., Polymer Electrolyte Fuel Cell (PEFC), Proton Exchange Membrane Fuel Cell (PEMFC), Solid Polymer Electrolyte Fuel Cell (SPEFC)) and a production process thereof, and more particularly to a separator for a solid polymer fuel cell, which is improved in terms of moldability or formability, electrical conductivity and mechanical properties as well as in terms of heat resistance, chemical resistance, dimensional stability, gas impermeability, etc. and can be obtained at low cost, and a production process thereof.

BACKGROUND ART

In recent years, fuel cells have attracted attention as clean, convenient energy sources. A fuel cell is a device designed to obtain electric energy from hydrogen obtained by reforming of raw fuels such as natural gas, methanol and gasified coal gas, and oxygen in the air. In principle, the fuel cell works oppositely to the electrolysis of water; it receives hydrogen and oxygen to form water, yielding direct-current power.

A fuel cell has desirable properties; it has high generation efficiency, it can harness electricity and heat at the same time, it ensures satisfactory preservation of the environment due to reduced amounts of air pollutants and limited noises, and it can make the rate of energy recovery higher than could be achieved with internal combustion engines. Depending on the type of the electrolyte used, the fuel cell is typically broken down into a phosphoric acid type, a molten carbonate type, a solid oxide type, and a solid polymer type.

Among others, solid polymer fuel cells using ion exchange resin membranes as electrolytes, because of generating high output densities on low-temperature works of the order of 60 to 80° C., are now under development in the form of relatively small generators used in buildings or plants, small generators for residential use purposes, power sources for zero-emission vehicles, and any other dispersion type power sources.

As shown in FIG. 1, a solid polymer fuel cell incorporates an ion exchange resin membrane 1 comprising a solid polymer as a solid electrolyte that is a proton conductor, and has an overall solid structure wherein gas diffusion electrodes 2 and 3 are joined to both sides of the membrane 1. With hydrogen fed to the side of anode 3 and oxygen or air to the side of cathode 2, the hydrogen is oxidized on the side of anode 3 to generate protons and electrons. The protons migrate through the membrane 1 with water molecules to the opposite side of cathode 2 where they are used for reduction of oxygen together with electrons fed from an external circuit 4 (load 5) to create water.

Solid polymer fuel cells, now available, are of various types. In a common type, a membrane-electrode combination, as shown in FIG. 1, is closely laminated on both sides with conductive separators 6 and 7 having some functions of polar chamber separation and gas feed passage via sealing gaskets 8 and 9, as shown in FIG. 2. A solid polymer fuel cell is used in the form of a stack wherein a number of such single cell units are stacked together.

A separator is a basic component material for a module having, in addition to the function of polar chamber separation, a function of forming gas flow passages or manifolds, a cooling function and a function of distributing materials uniformly. More specifically, a solid polymer fuel cell separator is required to have functions of ensuring a flow passage for a reaction gas entering in the fuel cell, transmitting electric energy generated at the fuel cell unit to the outside, and dissipating heat generated at the fuel cell unit to the outside.

For separator materials, carbon plates having acid resistance as well as satisfactory electrical conductivity and gas impermeability are often used because the surfaces of the ion exchange membrane possess strong acidity, and are provided on the surfaces with gas flow passage-forming grooves. However, costly machining is needed for grooves by cutting or the like; a problem with the carbon plate separator is that the separator cost accounts of a substantial portion of the total cost of a solid polymer fuel cell. Thus, various approaches have been proposed for improvements in separators.

JP-A 5-109415 proposes that a pure copper plate with gas feed grooves or manifolds formed by etching therein is used as a gas separator for a fuel cell incorporating an ion exchange membrane. However, problems with the metal plate are that its weight is heavy, costs for forming flow passages are high, no sufficient output is obtainable because of increased contact resistance between electrodes and the separator, etc.

JP-A's 11-126622 and 11-126621 proposes a separator for a low-temperature type fuel cell wherein a plating layer comprising a metal or a metal alloy with carbonaceous particles dispersed therein is formed on the surface of a stainless steel substrate, and the carbonaceous particles are exposed on the surface of the plating layer. However, problems with this separator are again that its weight is heavy, costs for machining flow passages are high, and there is concern about long-term reliability due to possible peeling of the plating layer.

WO97/02612 proposes a separator for a solid polymer electrolyte fuel cell, which comprises a carbon composite material wherein expanded graphite powders having a specific particle diameter are dispersed through a thermoplastic or thermosetting resin or its fired product. However, the expanded graphite is poor in handleability, and so the cost of its mass production becomes unavoidably high. When the expanded graphite is extruded through a common extruder into a carbon composite material, it cannot be packed therein at a high density because it is prone to cleave, failing to ensure any sufficient electrical conductivity necessary for a solid polymer fuel cell separator. When a separator comprising a carbon composite material is produced by compression molding, productivity becomes worse with an increased cost, because grooves for feeding oxidizing agent gas and fuel gas have to be formed by machining.

JP-A 2000-243409 proposes a solid polymer fuel cell separator formed of a thermoset carbon-resin material comprising carbon powders and a thermosetting resin. However, the separator formed of the thermoset carbon-resin material costs much. Another problem is that when thinned for the purpose of weight reductions, its strength cannot meet the mechanical properties demanded for fuel cells.

A solid polymer fuel cell separator is required to have high electrical conductivity and low gas permeability as well as improved mechanical properties, heat resistance, chemical resistance and dimensional stability. In consideration of cost reductions, a separator production process for which costly machining such as cutting is not necessary is also desired. For this reason, it has been proposed to make use of composite materials comprising resins and conductive carbon substances, as already described, in anticipation of formation of grooves, manifolds, etc. by pressing, extrusion molding, etc. upon separator formation.

However, the resin/conductive carbon substance composite materials are prone to increase in electrical resistance although depending on resin components. It is thus desired to lower electrical resistance by decreasing the proportion of the resin component and form the separator in the form of a thin layer; however, this renders moldability or formability, fine machinability and mechanical strength low.

DISCLOSURE OF THE INVENTION

An object of the invention is to provide a separator for solid polymer fuel cells, which has improved moldability or formability, electrical conductivity and mechanical properties as well as satisfactory heat resistance, chemical resistance, dimensional stability, gas impermeability, etc. and can be obtained at low cost, and a production process thereof.

The inventors have made intensive studies so as to achieve the above object and, consequently, found that a separator for solid polymer fuel cells, which is improved in terms of various properties, can be obtained by molding or forming a resin composition comprising a thermoplastic resin, a conductive carbon black having a bulk density of at least 0.3 g/ml and a DBP oil absorption of up to 150 ml/100 g and optionally a conductive filler having a volume resistivity of less than 1 Ω·cm.

The resin composition of the invention, even with the conductive carbon black or the conductive carbon black and filler packed therein at a high density, is so improved in terms of extrudability and injection moldability that it can be configured into even a separator of complicated configuration by means of injection molding as an example. In addition, the separator of the invention is improved in terms of electrical conductivity and mechanical strength.

It is noted that the resin composition of the invention, when the conductive carbon black or the conductive carbon black and filler are packed therein at a high density, is often poor in fluidity, making it difficult to obtain any precisely configured product. However, it has been found by further studies that this problem can be solved by injection molding of a mixture of the resin composition with a fluid having a boiling point of up to 250° C. The separator of the invention can be provided on its surface with fine flow passages, etc. upon molding or forming of the resin composition. These findings underlie the present invention.

Thus, the present invention provides a solid polymer fuel cell separator that is molded or formed of a resin composition comprising (A) 10 to 80% by mass of a thermoplastic resin, (B) 20 to 70% by mass of a conductive carbon black having a bulk density of at least 0.3 g/ml and a DBP oil absorption of up to 150 ml/100 g and (C) 0 to 40% by mass of a conductive filler having a volume resistivity of less than 1 Ω·cm.

The present invention also provides a process for producing a solid polymer fuel cell separator by injection molding of a resin composition comprising (A) 10 to 80% by mass of a thermoplastic resin, (B) 20 to 70% by mass of a conductive carbon black having a bulk density of at least 0.3 g/ml and a DBP oil absorption of up to 150 ml/100 g and (C) 0 to 40% by mass of a conductive filler having a volume resistivity of less than 1 Ω·cm.

BEST MODE FOR CARRYING OUT THE INVENTION

Thermoplastic Resin (A)

Figure 1:
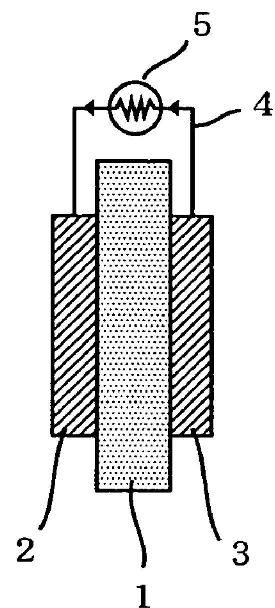
FIG. 1 is illustrative in section of the basic arrangement of a solid polymer fuel cell.
Figure 2:
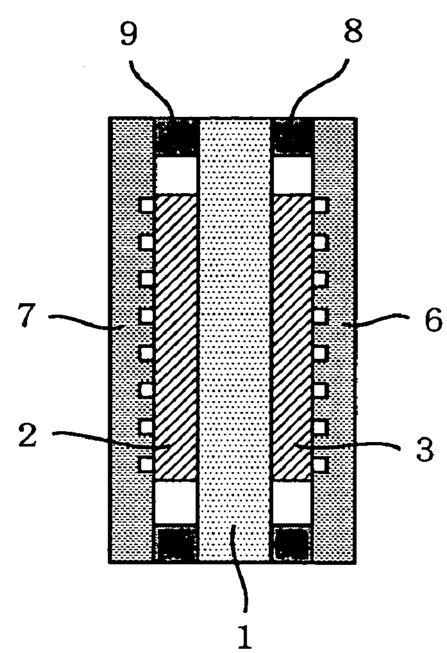
FIG. 2 is illustrative in section of one embodiment of a single cell unit in a solid polymer fuel cell.

By way of example but not by way of limitation, the thermoplastic resin used includes polyamide, polyacetal, thermoplastic polyester, polyolefin, poly(p-xylene), poly(vinyl chloride), poly(vinylidene chloride), polycarbonate, denatured or modified poly(phenylene ether), polyurethane, polydimethylsiloxane, poly(vinyl acetate), polystyrene, poly (methyl acrylate), poly(methyl methacrylate), ABS resin, poly(phenylene sulfide), poly(ether ether ketone), poly(ether ketone), poly(phenylene sulfide ketone), poly(phenylene sulfide sulfone), poly(ether nitrile), fluorocarbon resin, polyarylate, polysulfone, poly(ether sulfone), polyether imide, polyamide-imide, polyaminobismaleimide, triazine resin, diallyl terephthalate resin and liquid crystal polymer or their denatured or modified resins. These thermoplastic resins may be used alone or in combination of two or more.

The polyamide, for instance, includes nylon 6, nylon 66, nylon 610, nylon 612, nylon 11, nylon 12, nylon 46 and aromatic nylons, and the thermoplastic polyester, for instance, includes all aromatic polyesters, polyethylene terephthalate and polybutylene terephthalate. Exemplary polyolefins are polyethylene, polypropylene, polyisobutylene, polyisoprene and polybutene.

The fluorocarbon resin, for instance, includes tetrafluoroethylene/hexafluoropropylene copolymers, tetrafluoroethylene/perfluoroalkyl vinyl ether copolymers, poly(chlorofluoroethylene), poly(vinylidene fluoride), vinylidene fluoride/hexafluoropropylene/tetrafluoroethylene terpolymers, poly(vinyl fluoride), ethylene/tetrafluoroethylene copolymers, ethylene/chlorotrifluoroethylene copolymers, propylene/tetrafluoroethylene copolymers, tetrafluoroethylene/perfluoroalkylperfluorovinyl ether copolymers, vinylidene fluoride/hexafluoropropylene copolymers, vinylidene fluoride/chlorotrifluoroethylene copolymers, tetrafluoroethylene/ethylene/isobutylene terpolymers, ethylene/hexafluoropropylene copolymers, and tetrafluoroethylene/ethylviny ether copolymers.

Of these thermoplastic resins, preference is given to at least one thermoplastic resin selected from the group consisting of polyolefins such as polyethylene and polypropylene; poly(arylene sulfides) such as poly(phenylene sulfide); liquid crystal polymers; poly(vinylidene fluorides); thermoplastic polyesters such as all aromatic polyesters, poly (ethylene terephthalate) and poly(butylene terephthalate); polyamides; polyacetals; polycarbonates; poly(vinyl chlorides); and poly(ether ether ketones). More preferably, use is made of at least one thermoplastic resin selected from the group consisting of polypropylene, poly(phenylene sulfide), liquid crystal polymer and poly(vinylidene fluoride).

The proportion of the thermoplastic resin (A) used is in the range of 10 to 80% by mass, preferably 15 to 70% by mass, more preferably 25 to 65% by mass, and even more preferably 30 to 55% by mass. When the proportion of the thermoplastic resin is too high, the volume resistivity of the resin composition cannot be reduced down to any sufficient level, making it difficult to obtain a solid polymer fuel cell separator having any desired volume resistivity. When the proportion of the thermoplastic resin is too low, the moldability or formability of the resin composition becomes worse and the mechanical properties thereof become too low.

Conductive Carbon Black (B)

The conductive carbon black used herein should have a bulk density of 0.3 g/ml or greater and a DBP oil absorption of 150 ml/100 g or less. For this conductive carbon black, various types of carbon blacks such as carbon black, acetylene black, oil furnace black, thermal black and channel black may be used, provided that they satisfy the above requirements for bulk density and DBP oil absorption.

To pack the conductive carbon black in the resin composition at a high density to bring the volume resistivity thereof down to a sufficient level, it is desired to use a conductive carbon black having a bulk density of preferably 0.4 g/ml or greater, and more preferably 0.45 g/ml or greater. Although there is no upper limit to bulk density, it should be preferably about 0.6 g/ml, and more preferably about 0.55 g/ml.

Use of a conductive carbon black having too low a bulk density is not preferable, because problems arise with the productivity of the resin composition such as pellets. For instance, the pellets are likely to be affected by variations in the feed of the conductive carbon black upon pellet preparation through an extruder, and because the volume of the resin composition occupied by the carbon black in an extruder becomes too large to extrude the resin composition stably over an extended period of time.

The DBP oil absorption of the conductive carbon black is measured pursuant to the ASTM D-2414 method. More specifically, a conductive carbon black sample is placed in a chamber in a measuring device (absorptometer), to which DBP (n-dibutyl phthalate) is then added at a constant rate. As DBP is absorbed in the sample, the viscosity of the sample increases to a certain level, at which the DBP oil absorption can be found from the amount of DBP absorbed in the sample. Viscosity is measured by means of a torque sensor.

The proportion of the conductive carbon black used is in the range of 20 to 70% by mass, preferably 25 to 65% by mass, more preferably 30 to 63% by mass, and even more preferably 35 to 60% by mass. Too much conductive carbon black renders the moldability or formability of the resin composition worse and, hence, the mechanical properties of the molded product too low, and too little makes it impossible to bring the volume resistivity of the resin composition down to a sufficient level, and so it is difficult to obtain a solid polymer fuel cell separator having any desired volume resistivity.

Conductive Filler (C)

For the purpose of making improvements in the extrudability or injection moldability, mechanical strength, electrical conductivity, etc. of the resin composition, the conductive filler having a volume resistivity of less than 1 Ω·cm is used herein. The term "conductive filler" used herein is understood to mean a conductive filler other than the conductive carbon black.

The conductive filler having a volume resistivity of less than 1 Ω·cm used herein includes, but is not limited to, carbon fibers, graphite, and metal powders. Depending on the type of the thermoplastic resin and the performance of the resin composition demanded, it is preferable to make a selection from available conductive fillers. Specifically, carbon fibers are preferred in consideration of mechanical properties and electrical conductivity, and graphite is desired in consideration of moldability or formability and electrical conductivity. In view of electrical conductivity, metal powders are preferred. Although these conductive fillers may be used alone, it is understood that combined use of two or more contributes to improvements in two or more properties.

No particular limitation is imposed on the carbon fibers used herein; various carbon fibers such as those based on cellulose, polyacrylonitrile (PAN), lignin and pitch may be used. The carbon fibers should preferably have an average fiber diameter of 0.1 mm or less. Carbon fibers having too large an average fiber diameter render it difficult to obtain a molded or formed product having satisfactory exterior appearance, which is configured into a solid polymer fuel cell separator. The carbon fibers should preferably be in a short fiber form having an average fiber length of 30 μm or greater. Use of carbon fibers having an average fiber length of less than 30 μm is less effective on improvements in creep properties, modulus of elasticity, strength, etc. It is noted that even with carbon fibers having an average fiber length of 30 μm or greater, the average fiber length of carbon fibers in a molded or formed product is considerably reduced by melt kneading or molding (forming) with the resin component, etc.

There is no particular limitation on the graphite used herein; use may be made of artificial graphite obtained by graphitization at high temperature of coke, tar, pitch or the like, naturally occurring graphite such as scaly graphite, flaky graphite and clay graphite, and expanded graphite.

The conductive filler used herein has a volume resistivity of less than 1 Ω·cm, and the lower limit thereto is usually defined by the volume resistivity of a metal material such as metal powders or metal fibers. The proportion of the conductive filler having a volume resistivity of less than 1 Ω·cm is in the range of 0 to 40% by mass, preferably 2 to 35% by mass, and more preferably 3 to 30% by mass. In most cases, satisfactory results are obtainable when the proportion of the conductive filler is about 5 to about 25% by mass; however, this may be used in larger amounts. When the proportion of the conductive filler is too high, the moldability or formability of the resin composition becomes worse and the mechanical properties of a molded or formed product is likely to become low. Use of the conductive filler in too small an amount is not preferable because it is difficult to bring the volume resistivity down to a sufficient level and to obtain a solid polymer fuel cell separator having any desired volume resistivity.

Other Fillers

With a view to enhancing mechanical strength and heat resistance, the solid polymer fuel cell separator of the invention may contain various fillers that are exemplified by fibrous fillers including inorganic fibrous materials such as glass fibers, carbon fibers, asbestos fibers, silica fibers, alumina fibers, zirconia fibers, boron nitride fibers, silicon nitride fibers, boron fibers and potassium titanate fibers; metallic fibrous materials such as stainless, aluminum, titanium, steel and brass fibers; and high-melting organic fibrous materials formed typically of polyamide, fluorocarbon resin, polyester resin and acrylic resin.

Any other fillers usable herein, for instance, include particulate or powdery fillers such as mica, silica, talc, alumina, kaolin, calcium sulfate, calcium carbonate, titanium oxide, ferrite, clay, glass powders, zinc oxide, nickel carbonate, iron oxide, quartz powders, magnesium carbonate and barium sulfate.

These fillers may be used alone or in combination of two or more, and may have been treated with sizing or surface-treating agents as needed. Exemplary sizing or surface-treating agents include functional compounds such as epoxy compounds, isocyanate compounds, silane compounds and titanate compounds, which may have been used to bind the filler together or treat the surface of the filler or, alternatively, added to the filler simultaneously with composition preparation.

Other Additives

In addition to the above additives, the solid polymer fuel cell separator of the invention may optionally contain impact modifiers such as methyl methacrylate-butadiene-styrene resin (MBS), ethylene-propylene-diene copolymers (EPDM) and epoxy group-containing α-olefin copolymers; resin improvers such as ethylene glycidyl methacrylate; metal corrosion preventives such as zinc carbonate and nickel carbonate; lubricants such as pentaerythritol tetrastearate; thermosetting resins; antioxidants; ultraviolet absorbers; nucleating agents such as boron nitride; flame retardants; coloring agents such as dyes and pigments; and additives having solid lubricating properties such as polytetrafluoroethylene and polyethylene wax. Especially when the proportion of the conductive carbon black or the conductive carbon black plus filler used is high, it is effective to add up to 10% by mass of an additive having solid lubricating properties, thereby making improvements in moldability or formability.

Production of Solid Polymer Fuel Cell Separator

The separator for solid polymer fuel cells according to the invention may be produced by melt processes commonly applied to thermoplastic resin materials. A preferred production process comprises two stages. At the first stage, the resin composition is pelletized with the apparatus and method commonly used for preparation of thermoplastic resin compositions. For instance, the respective raw components are premixed together in a Heschel mixer, a tumbler or the like. If necessary, the premix is mixed with fillers such as glass fibers. Using a single- or twin-screen extruder or a kneader such as a Banbury mixer, the mixture is kneaded and extruded into a molding or forming pellet. The molding or forming pellet may also be obtained by pulverization of the kneaded product.

A process wherein a part of the raw components is prepared as a master batch and the master batch is then mixed with the rest of the components may be used. To enhance the dispersibility of each component, use may also be made of a process wherein a part of the starting material is pulverized into a uniform particle diameter and then subjected to melt extrusion.

When the proportion of the conductive carbon black or the conductive carbon black and filler in the resin composition is high, it is effective to rely on a process wherein the thermoplastic resin to be used is mixed with a fluid having high affinity for it and a boiling temperature of up to 250° C. thereby enhancing its fluidity. For instance, such a fluid includes an amide compound such as N,N-dimethylformamide, N,N-dimethylacetamide; N-alkylpyrrolidone or N-cycloalkylpyrrolidone compounds such as N-methyl-E-caprolactam, N-methyl-2-pyrrolidone (NMP for short) and N-cyclohexyl-2-pyrrolidone; N,N-dialkylimidazolidinone compounds such as 1,3-dialkyl-2-imidazolidinone; tetraalkylurea compounds such as tetramethylurea and hexaalkylphosphoric triamide compounds such as hexamethylphosphoric triamide.

At the second stage, the pellet of the resin composition is molded or formed into a solid polymer fuel cell separator. In consideration of cost, it is preferable to adopt a process of molding a solid polymer fuel cell separator by means of injection molding. It is then preferable to make use of a process wherein the thermoplastic resin (A) used for pelletization is mixed with the fluid having high affinity for it and a boiling point of 250° C. or lower for injection molding thereby enhancing the fluidity of that resin. In view of quality, the mold and injection conditions applied should preferably be designed such that the fluid added for fluidity improvements is discharged via a gas vent formed in that mold.

More specifically, it is preferable to make use of a process wherein 100 parts by weight of the resin composition are mixed with 1 to 900 parts by weight of the fluid having a boiling point of 250° C. or lower, and the mixture is then injection molded followed by removal of that fluid from within a mold in an injection molding machine. The proportion of the fluid mixed is in the range of preferably 5 to 500 parts by weight, more preferably 10 to 300 parts by weight, and even more preferably 15 to 150 parts by weight.

The mold used should preferably be configured such that flow passages or manifolds are formed in the surface of the separator. The resin composition of the invention, because of being excellent in injection moldability, is capable of precise processing. If necessary, the separator obtained by means of injection molding could be further machined, laminated on its surface with a carbon sheet or film or deposited on its surface with a metal by means of evaporation.

The separator of the invention should have a volume resistivity of preferably 0.001 to 1 Ω·cm, more preferably 0.005 to 0.5 Ω·cm, and even more preferably about 0.01 to 0.3 Ω·cm, and a bending strength of preferably 40 MPa or greater, more preferably 45 MPa or greater, and even more preferably 50 MPa or greater. Although the upper limit to bending strength varies with the type and proportion of the thermoplastic resin and additive components, it should be preferably 200 MPa, and more preferably 150 MPa.

EXAMPLES

More specifically but not exclusively, the present invention is now explained with reference to some inventive and comparative examples. Physical properties are measured as follows.

(1) Volume Resistivity

Volume resistivity was measured pursuant to JIS K-7194 (the testing method for measuring the resistivity of conductive plastics with 4 probes).

(2) Bending Strength

Bending strength was measured pursuant to ASTM D-790.

(3) Extrudability/Injection Moldability

Pellets were prepared by extrusion, and injection molded into test pieces. "Good" indicates that both extrusion and injection molding could be carried out in a stable manner, and "Bad" indicates that any stable extrusion could not be carried out.

Example 1

Forty (40) percent by mass of polypropylene (PP; Grand Polypro J108M made by Grand Polymer Co., Ltd.), 55% by mass of conductive carbon black (#33B made by Mitsubishi Chemical Industries, Ltd. with a bulk density of 0.47 g/ml and a DBP oil absorption of 76 ml/100 g) and 5% by mass of carbon fibers (PAN-based carbon fibers; Bethfight HTA3000 made by Toho Rayon Co., Ltd.) were uniformly dry blended together in a tumbler mixer, and the blend was fed to a 45-mmϕ twin-screw kneader/extruder (PCM-45 made by Ikegai Tekko Co., Ltd.) for melt extrusion, thereby preparing a pellet. After drying, the obtained pellet was injection molded through an injection molding machine (IS-75 made by Toshiba Machine Co., Ltd.) to make a test piece for bending strength measurement.

Upon pellet preparation, the blend could be extruded in a stable manner and the injection moldability of the pellet was satisfactory as well. The test piece was found to have a volume resistivity of 0.06 Ω·cm and a bending strength of 65 MPa, indicating that improved electrical conductivity and mechanical properties were obtained. The results are set out in Table 1.

Example 2

Pellets and test pieces were prepared as in Example 1 with the exception that the components set out in Table 1 were used. In this example, polyethylene wax (PE WAX; High Wax 220P made by Mitsui Petrochemical Industries, Ltd.) was added to the resin composition for the purpose of improving its lubricating properties. Upon pellet preparation, the blend could be extruded in a stable manner and the injection moldability of the pellet was satisfactory as well. The test piece was found to have a volume resistivity of 0.01 Ω·cm and a bending strength of 60 MPa, indicating that improved electrical conductivity and mechanical properties were obtained. The results are set out in Table 1.

Example 3

Pellets and test pieces were prepared as in Example 1 with the exception that 55% by mass of poly(vinylidene fluoride) (PVDF; KF Polymer W10 made by Kureha Chemical Industries Co., Ltd.), 35% by mass of conductive carbon black (#33B made by Mitsubishi Chemical Industries, Ltd.), 5% by mass of carbon fibers (Bethfight HTA3000 made by Toho Rayon Co., Ltd.) and 5% by mass of graphite (Artificial Graphite HAG-15 made by Nippon Graphite Industries, Ltd.) were used. Upon pellet preparation, the blend could be extruded in a stable manner the injection moldability of the pellet was satisfactory as well. The test piece was found to have a volume resistivity of 0.1 Ω·cm and a bending strength of 60 MPa, indicating that improved electrical conductivity and mechanical properties were obtained. The results are set out in Table 1.

Example 4

Fifty (50) percent by mass of PVDF (KF Polymer W10 made by Kureha Chemical Industries, Ltd.), 45% by mass of conductive carbon black (#33B made by Mitsubishi Chemical Industries, Ltd.) and 5% by mass of carbon fibers (Bethfight HTA3000 made by Toho Rayon Co., Ltd.) were uniformly dry blended together in a tumbler mixer, and the blend was fed to a 45-mmϕ twin-screw kneader/extruder (PCM-45 made by Ikegai Tekko Co., Ltd.) for melt extrusion, thereby preparing a pellet. The resultant pellet was dried.

One hundred (100) parts by weight of the pellet (resin composition) were mixed with 100 parts by weight of N-methyl-2-pyrrolidone (NMP having a boiling point of 202° C.), and the mixture was fed to an injection molding machine (IS-75 made by Toshiba Machine Co., Ltd.) for injection molding, thereby preparing a test piece for bending strength measurement. NMP was discharged out of a mold through a gas vent formed in the mold in the injection molding machine. Upon pellet preparation, the blend was extruded in a stable manner, and the pellet/NMP mixture was satisfactorily injection molded as well. The test piece was found to have a volume resistivity of 0.01 Ω·cm and a bending strength of 55 MPa, indicating that improved electrical conductivity and mechanical properties were obtained. The results were set out in Table 1.

Example 5

Pellets and test pieces were prepared as in Example 1 with the exception that 45% by mass of polyphenylene sulfide (PPS; Fortlon KPS W202A made by Kureha Chemical Industries Co., Ltd.), 45% by mass of conductive carbon black (#33B made by Mitsubishi Chemical Industries, Ltd.), 5% by mass of carbon fibers (Bethfight HTA3000 made by Toho Rayon Co., Ltd.) and 5% by mass of graphite (Artificial Graphite HAG-15 made by Nippon Graphite Industries, Ltd.) were used. Upon pellet preparation, the blend could be extruded in a stable manner and the injection moldability of the pellet was satisfactory as well. The test piece was found to have a volume resistivity of 0.15 Ω·cm and a bending strength of 82 MPa, indicating that improved electrical conductivity and mechanical properties were obtained. The results are set out in Table 1.

Example 6

Pellets were prepared as in Example 1 with the exception that the components set out in Table 1 were used, and then dried. One hundred (100) parts by weight of the pellets (resin composition) were mixed with 20 parts by weight of NMP, and the mixture was fed to an injection molding machine (IS-75 made by Toshiba Machine Co., Ltd.) for injection molding, thereby preparing a test piece for bending strength measurement. NMP was discharged out of a mold through a gas vent provided in the mold in the injection molding machine. Upon pellet preparation, the blend could be extruded in a stable manner, and the injection moldability of the pellet/NMP mixture was satisfactory as well. The test piece was found to have a volume resistivity of 0.03 Ω·cm and a bending strength of 75 MPa, indicating that improved electrical conductivity and mechanical properties were obtained. The results are set out in Table 1.

Example 7

Pellets were prepared as in Example 1 with the exception that the components set out in Table 1 were used, and then dried. One hundred (100) parts by weight of the pellets (resin composition) were mixed with 100 parts by weight of NMP, and the mixture was fed to an injection molding machine (IS-75 made by Toshiba Machine Co., Ltd.) for injection molding, thereby preparing a test piece for bending strength measurement. NMP was discharged out of a mold through a gas vent provided in the mold in the injection molding machine. Upon pellet preparation, the blend could be extruded in a stable manner, and the injection moldability of the pellet/NMP mixture was satisfactory as well. The test piece was found to have a volume resistivity of 0.01 Ω·cm and a bending strength of 55 MPa, indicating that improved electrical conductivity and mechanical properties were obtained. The results are set out in Table 1.

Example 8

Pellets and test pieces were prepared as in Example 1 with the exception that 40% by mass of liquid crystal polymer (LCP: UENO-LCP2000 made by Ueno Pharmaceutics Co., LTd.), 55% by mass of conductive carbon black (#33B made by Mitsubishi Chemical Industries, Ltd.) and 5% by mass of graphite (Artificial Graphite HAG-15 made by Nippon Graphite Industries Co., Ltd.) were used. Upon pellet preparation, the blend could be extruded in a stable manner and the injection moldability of the pellet was satisfactory as well. The test piece was found to have a volume resistivity of 0.03 Ω·cm and a bending strength of 90 MPa, indicating that improved electrical conductivity and mechanical properties were obtained. The results are set out in Table 1.

Example 9

Pellets and test pieces were prepared as in Example 1 with the exception that 40% by mass of liquid crystal polymer (LCP; UENO-LCP2000 made by Ueno Pharmaceutics Co., LTd.), 35% by mass of conductive carbon black (#33B made by Mitsubishi Chemical Industries, Ltd.) and 25% by mass of graphite (Artificial Graphite HAG-15 made by Nippon Graphite Industries Co., Ltd.) were used. Upon pellet preparation, the blend could be extruded in a stable manner and the injection moldability of the pellet was satisfactory as well. The test piece was found to have a volume resistivity of 0.01 Ω·cm and a bending strength of 85 MPa, indicating that improved electrical conductivity and mechanical properties were obtained. The results are set out in Table 1.

Comparative Example 1

Pellets and test pieces were prepared as in Example 1 with the exception that 77% by mass of PP (Grand Polypro J108M made by Grand Polymer Co., Ltd.), 18% by mass of conductive carbon black (#33B made by Mitsubishi Chemical Industries, Ltd.) and 5% by mass of carbon fibers (Bethfight HTA3000 made by Toyo Rayon Co., Ltd.) were used. Upon pellet preparation, the blend could be extruded in a stable manner, and the injection moldability of the pellet was satisfactory as well. However, the proportion of the conductive carbon black used was low, and the test piece had a volume resistivity of as high as 20 Ω·cm, indicating that no sufficient electrical conductivity was obtained.

Comparative Example 2

Seventy (70) percent by mass of PP (Grand Polypro J108M made by Grand Polymer Co., Ltd.), 25% by mass of conductive carbon black (MA600B made by Mitsubishi Chemical Industries, Ltd. with a bulk density of 0.25 g/ml and a DBP oil absorption of 124 ml/100 g) and 5% by mass of carbon fibers (Bethfight HTA3000 made by Toho Rayon Co., Ltd.) were uniformly dry blended together in a tumbler mixer. An effort to feed the blend to a 45-mmϕ twin-screw kneader/extruder (PCM-45 made by Ikegai Tekko Co., Ltd.) to prepare pellets by melt extrusion, however, resulted in a failure in stable extrusion because the extruder stopped working due to overloads on a motor. It was found that use of conductive carbon black having a low bulk density made extrudability worse. No test piece could be obtained. The results are set out in Table 1.

Comparative Example 3

Seventy-five (75) percent by mass of PVDF (KF Polymer W10 made by Kureha Chemical Industries, Ltd.), 20% by mass of conductive carbon black (MA600B made by Mitsubishi Chemical Industries, Ltd.) and 5% by mass of carbon fibers (Bethfight HTA3000 made by Toho Rayon Co., Ltd.) were uniformly dry blended together in a tumbler mixer. An effort to feed the blend to a 45-mmϕ twin-screw kneader/extruder (PCM-45 made by Ikegai Tekko Co., Ltd.) to prepare pellets by melt extrusion, however, resulted in a failure in stable extrusion because the extruder stopped working due to overloads on a motor. Use of the conductive carbon black having a low bulk density was believed to be the cause of making extrudability worse. No test piece could be obtained. The results are set out in Table 1.

Comparative Example 4

Eighty-five (85) percent by mass of PPS (Fortlon KPS W202A made by Kureha Chemical Industries, Ltd.), 10% by mass of conductive carbon black (Ketchen Black EC60OJD made by The Lion Co., Ltd. with a bulk density of 0.15 g/ml and a DBP oil absorption of 495 ml/100 g) and 5% by mass of carbon fibers (Bethfight HTA3000 made by Toho Rayon Co., Ltd.) were uniformly dry blended together in a tumbler mixer. An effort to feed the blend to a 45-mmϕ twin-screw kneader/extruder (PCM-45 made by Ikegai Tekko Co., Ltd.) to prepare pellets by melt extrusion, however, resulted in a failure in stable extrusion because the extruder stopped working due to overloads on a motor. Use of the conductive carbon black having a low bulk density and a large DBP oil absorption was believed to be the cause of making extrudability worse. No test piece could be obtained. The results are set out in Table 1.

Comparative Example 5

Pellets and test pieces were prepared as in Example 1 with the exception that 35% by mass of LCP (UENO-LCP2000 made by Ueno Pharmaceutics Co. Ltd.) and 65% by mass of graphite (artificial graphite HAG-15 made by Nippon Graphite Co., Ltd.) were used. Upon pellet preparation, the blend could be extruded in a stable manner, and the injection moldability of the pellet was satisfactory as well. However, the test piece had a volume resistivity of 2 Ω·cm, indicating that no sufficient electrical conductivity was obtained. The results are set out in Table 1.

Comparative Example 6

An effort was made to prepare pellets as in Example 1 with the exception that 25% by mass of LCP (UENO-LCP2000 made by Ueno Pharmaceutics Co. Ltd.) and 75% by mass of graphite (artificial graphite HAG-15 made by Nippon Graphite Co., Ltd.) were used. Upon pellet preparation, however, the extruder stopped working due to overloads on a motor, resulting in a failure in stable extrusion. No test piece was obtained. The results are set out in Table 1.

TABLE 1

| | Inventive Example | | | | | | | | | Comparative Example | | | | | |
|---|---|---|---|---|---|---|---|---|---|---|---|---|---|---|---|
| | 1 | 2 | 3 | 4 | 5 | 6 | 7 | 8 | 9 | 1 | 2 | 3 | 4 | 5 | 6 |
| Thermoplastic resin | | | | | | | | | | | | | | | |
| PP | 40 | 30 | — | — | — | — | — | — | — | 77 | 70 | — | — | — | — |
| PVDF | — | — | 55 | 50 | — | — | — | — | — | — | — | 75 | — | — | — |
| PPS | — | — | — | — | 45 | 40 | 30 | — | — | — | — | — | 85 | — | — |
| LCP | — | — | — | — | — | — | — | 40 | 40 | — | — | — | — | 35 | 25 |
| Conductive carbon black | | | | | | | | | | | | | | | |
| A | 55 | 60 | 35 | 45 | 45 | 50 | 65 | 55 | 35 | 18 | — | — | — | — | — |
| B | — | — | — | — | — | — | — | — | — | — | 25 | 20 | — | — | — |
| C | — | — | — | — | — | — | — | — | — | — | — | — | 10 | — | — |
| Carbon fibers | 5 | 5 | 5 | 5 | 5 | 5 | — | — | — | 5 | 5 | 5 | 5 | — | — |
| Graphite | — | — | 5 | — | 5 | 5 | 5 | 5 | 25 | — | — | — | — | 65 | 75 |
| Additives | | | | | | | | | | | | | | | |
| PE WAX | — | 5 | — | — | — | — | — | — | — | — | — | — | — | — | — |
| Fluid | | | | | | | | | | | | | | | |
| NMP | — | — | — | 100 | — | 20 | 100 | — | — | — | — | — | — | — | — |
| Volume resistivity Ω · cm | 0.06 | 0.01 | 0.1 | 0.01 | 0.15 | 0.03 | 0.01 | 0.03 | 0.01 | 20 | — | — | — | 2 | — |
| Bending strength MPa | 65 | 60 | 60 | 55 | 82 | 75 | 55 | 90 | 85 | 60 | — | — | — | 45 | — |
| Extrudability/ injection moldability | Good | Good | Good | Good | Good | Good | Good | Good | Good | Good | Bad | Bad | Bad | Good | Bad |

Notes:

(1) PP: polypropylene; Grand Polypro J108M (made by Grand Polymer Co., Ltd.)

(2) PVDF: polyvinylene fluoride; KF Polymer W10 (made by Kureha Chemical Industries, Ltd.)

(3) PPS: polyphenylene sulfide; Fortlon KPSW202A (made by Kureha Chemical Industries, Ltd.)

(4) LCP: liquid crystal polymer; UENO-LCP2000 (made by Ueno Pharmaceutics Co., Ltd.)

(5) Conductive carbon black A: #33B having a bulk density of 0.47 g/ml and a DBP oil absorption of 76 ml/100 g (made by Mitsubishi Chemical Industries, Ltd.)

(6) Conductive carbon black B: MA600B having a bulk density of 0.25 g/ml and a DBP oil absorption of 124 ml/100 g (made by Mitsubishi Chemical Industries, Ltd.)

(7) Conductive carbon black C: Ketchen Black EC600JD having a bulk density of 0.15 g/ml and a DBP oil absorption of 495 ml/100 g (made by The Lion Co. Ltd.)

(8) Carbon fibers: PAN-based carbon fibers; Bethfight HTA3000 (made by Toho Rayon Co., Ltd.)

(9) Graphite: Artificial Graphite HAG-15 (Nippon Graphite Industries, Ltd.)

(10) PE WAX: polyethylene wax; High Wax 220P (made by Mitsui Petrochemical Industries, Ltd.)

(11) NMP: N-methyl-2-pyrrolidone

INDUSTRIAL APPLICABILITY

The present invention provides a separator for solid polymer fuel cells, which is improved in terms of moldability or formability, electrical conductivity and mechanical properties as well as heat resistance, chemical resistance, dimensional stability, gas impermeability, etc. and can be obtained at low cost. The present invention also provides a process for the production of that solid polymer fuel cell separator.

The invention claimed is:

1. A solid polymer fuel cell separator that is molded or formed of a resin composition comprising (A) 25 to 65% by mass of a thermoplastic resin, (B) 25 to 65% by mass of a conductive carbon black having a bulk density of at least 0.3 g/ml and a DBP oil absorption of up to 100 ml/100 g, and (C) 2 to 35% by mass of at least one conductive filler selected from the group consisting of carbon fiber and graphite and having a volume resistivity of less than 1 Ω·cm, wherein said solid polymer fuel cell separator has a volume resistivity of 0.001 to 1 Ω·cm and a bending strength of at least 40 MPa.

2. The solid polymer fuel cell separator according to claim 1, wherein said thermoplastic resin (A) is at least one thermoplastic resin selected from the group consisting of a polyolefin, a poly (arylene sulfide), a liquid crystal polymer, a poly (vinylidene fluoride), a thermoplastic polyester, a polyamide, a polyacetal, a polycarbonate, a poly (vinyl chloride) and a poly (ether ether ketone).

3. The solid polymer fuel cell separator according to claim 1, wherein said thermoplastic resin (A) is at least one thermoplastic resin selected from the group consisting of a polypropylene, a poly (phenylene sulfide), a liquid crystal polymer and a poly (vinylidene fluoride).

4. The solid polymer fuel cell separator according to claim 1, wherein said conductive carbon black (B) has a bulk density of at least 0.4 g/ml.

5. The solid polymer fuel cell separator according to claim 1, wherein said conductive carbon black (B) has a bulk density of at least 0.45 g/ml.

6. The solid polymer fuel cell separator according to claim 1, wherein said resin composition contains an additive having solid lubricating properties in a proportion of up to 10% by mass.

7. The solid polymer fuel cell separator according to claim 1, wherein said thermoplastic resin (A) is used in a proportion of 30 to 55% by mass.

8. The solid polymer fuel cell separator according to claim 1, wherein said conductive carbon black (B) is used in a proportion of 30 to 63% by mass.

9. The solid polymer fuel cell separator according to claim 1, wherein said conductive filler (C) is used in a proportion of 3 to 30% by mass.

10. The solid polymer fuel cell separator according to claim 1, wherein said solid polymer fuel cell separator has a volume resistivity of 0.01 to 0.3 Ω·cm and a bending strength of at least 50 MPa.

11. A process for producing a solid polymer fuel cell separator by injection molding of a resin composition comprising (A) 25 to 65% by mass of a thermoplastic resin, (B) 25 to 65% by mass of a conductive carbon black having a bulk density of at least 0.3 g/ml and a DBP oil absorption of up to 100 ml/100 g, and (C) 2 to 35% by mass of at least one conductive filler selected from the group consisting of carbon fiber and graphite and having a volume resistivity of less than 1 Ω·cm. wherein a solid polymer fuel cell separator having a volume resistivity of 0.001 to 1 Ω·cm and a bending strength of at least 40 MPa is obtained.

12. The production process according to claim 11, wherein upon injection molding of said resin composition, a mixture of 1 to 900 parts by weight of a fluid having a boiling point of up to 250° C. with 100 parts by weight of said resin composition is injection molded, while said fluid is discharged out of a mold in an injection molding machine.

13. The production process according to claim 12, wherein a mixture of a pellet of said resin composition with said fluid is injected into said mold in said injection molding machine, wherein said fluid is discharged through a gas vent in said mold.

14. The production process according to claim 12, wherein said fluid is an amide compound, an N-alkylpyrrolidone compound, an N-cycloalkylpyrrolidone compound, an N,N-dialkylimidazolidinone compound, a tetraalkylurea compound or a hexaalkylphosphoric triamde compound.

15. The production process according to claim 14, wherein said N-alkylpyrrolidone compound is N-methyl-2-pyrrolidone.

16. The production process according to claim 11, wherein said thermoplastic resin (A) is at least one thermoplastic resin selected from the group consisting of a polyolefin, a poly (arylene sulfide), a liquid crystal polymer, a poly (vinylidene fluoride), a thermoplastic polyester, a polyamide, a polyacetal, a polycarbonate, a poly (vinyl chloride) and a poly (ether ether ketone).

17. The production process according to claim 16, wherein said thermoplastic resin (A) is at least one thermoplastic resin selected from the group consisting of a polypropylene, a poly (phenylene sulfide), a liquid crystal polymer and a poly (vinylidene fluoride).

18. The production process according to claim 11, wherein said conductive carbon black (B) has a bulk density of at least 0.4 g/ml.

19. The production process according to claim 11, wherein said conductive carbon black (B) has a bulk density of at least 0.45 g/ml.

20. The production process according to claim 11, wherein said thermoplastic resin (A) is used in a proportion of 30 to 55% by mass.

21. The production process according to claim 11, wherein said conductive carbon black (B) is used in a proportion of 30 to 63% by mass.

22. The production process according to claim 11, wherein said conductive filler (C) is used in a proportion of 3 to 30% by mass.

23. The production process according to claim 11, wherein said resin composition contains an additive having solid lubricating properties in a proportion of upto 10% by mass.

24. The production process according to claim 11, wherein a solid polymer fuel cell separator having a volume resistivity of 0.01 to 0.3 Ω·cm and a bending strength of at least 50 MPa is obtained.

* * * * *